(12) United States Patent
Sreenivasan et al.

(10) Patent No.: US 7,627,694 B2
(45) Date of Patent: Dec. 1, 2009

(54) MAINTAINING PROCESS GROUP MEMBERSHIP FOR NODE CLUSTERS IN HIGH AVAILABILITY COMPUTING SYSTEMS

(75) Inventors: Padmanabhan Sreenivasan, Sunnyvale, CA (US); Ajit Dandapani, Los Altos, CA (US); Michael Nishimoto, San Jose, CA (US); Ira Pramanick, San Jose, CA (US); Manish Verma, Sunnyvale, CA (US); Robert David Bradshaw, San Jose, CA (US); Luca Castellano, Los Gatos, CA (US); Sharad Srivastava, San Jose, CA (US); Raghu Mallena, San Jose, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 366 days.

(21) Appl. No.: 09/811,158

(22) Filed: Mar. 16, 2001

(65) Prior Publication Data

US 2002/0049845 A1 Apr. 25, 2002

Related U.S. Application Data

(60) Provisional application No. 60/189,864, filed on Mar. 16, 2000.

(51) Int. Cl.
*G06F 15/16* (2006.01)
(52) U.S. Cl. .................. 709/251; 709/252; 709/249
(58) Field of Classification Search .......... 709/226, 709/239, 228, 251, 252, 249; 395/200, 500; 714/4
See application file for complete search history.

(56) References Cited

U.S. PATENT DOCUMENTS

| | | | |
|---|---|---|---|
| 5,513,314 A | | 4/1996 | Kandasamy et al. |
| 5,526,492 A | * | 6/1996 | Ishida .......................... 709/228 |
| 5,590,285 A | | 12/1996 | Krause et al. |
| 5,805,785 A | | 9/1998 | Dias et al. |
| 5,852,724 A | * | 12/1998 | Glenn et al. ................. 709/239 |
| 5,862,348 A | * | 1/1999 | Pedersen ..................... 709/229 |
| 5,941,999 A | * | 8/1999 | Matena et al. ................. 714/6 |

(Continued)

FOREIGN PATENT DOCUMENTS

WO    WO-9849620 A1    11/1998

OTHER PUBLICATIONS

"499-074US2 Jan. 4, 2005 non-final office action".
"499-074US2 Nov. 1, 2005 non-final office action".
"499-074US2 May 3, 2006 final office action".

(Continued)

*Primary Examiner*—Ramsey Refai
(74) *Attorney, Agent, or Firm*—Schwegman, Lundberg & Woessner P.A.

(57) ABSTRACT

A high availability computing system includes a plurality of computer nodes (for example, a server system) connected by a first and a second network, wherein the computer nodes communicate with each other to detect server failure and transfer applications to other computer nodes on detecting server failure. The system incorporates methods of maintaining high availability in a server cluster having a plurality of nodes. A group communications service, a membership service and a system resource manager are instantiated on each node and the group communications service, the membership service and the system resource manager on each node communicate with other nodes to detect node failures and to transfer applications to other nodes on detecting node failure.

17 Claims, 3 Drawing Sheets

U.S. PATENT DOCUMENTS

| | | | |
|---|---|---|---|
| 5,987,621 A | 11/1999 | Duso et al. | |
| 6,047,323 A | 4/2000 | Krause | |
| 6,145,089 A * | 11/2000 | Le et al. | 714/4 |
| 6,185,695 B1 | 2/2001 | Murphy et al. | |
| 6,189,111 B1 * | 2/2001 | Alexander et al. | 714/8 |
| 6,243,825 B1 | 6/2001 | Gamache et al. | |
| 6,266,781 B1 | 7/2001 | Chung et al. | |
| 6,292,905 B1 | 9/2001 | Wallach et al. | |
| 6,438,704 B1 | 8/2002 | Harris et al. | |
| 6,438,705 B1 * | 8/2002 | Chao et al. | 714/4 |
| 6,442,685 B1 | 8/2002 | French et al. | |
| 6,487,622 B1 * | 11/2002 | Coskrey et al. | 710/241 |
| 6,496,941 B1 | 12/2002 | Segal et al. | |
| 6,532,494 B1 * | 3/2003 | Frank et al. | 709/224 |
| 6,539,494 B1 * | 3/2003 | Abramson et al. | 714/4 |
| 6,594,786 B1 | 7/2003 | Connelly et al. | |
| 6,636,982 B1 | 10/2003 | Rowlands | |
| 6,647,430 B1 * | 11/2003 | Minyard et al. | 709/251 |
| 6,745,241 B1 | 6/2004 | French et al. | |
| 6,785,678 B2 * | 8/2004 | Price | 707/8 |
| 6,857,082 B1 * | 2/2005 | Josan et al. | 714/4 |
| 6,859,882 B2 | 2/2005 | Fung | |
| 6,892,317 B1 | 5/2005 | Sampath et al. | |
| 6,901,530 B2 | 5/2005 | Cerami et al. | |
| 6,952,766 B2 | 10/2005 | Dervin et al. | |
| 7,310,683 B2 * | 12/2007 | Shobatake | 709/238 |

OTHER PUBLICATIONS

"499.074US2 Nov. 28, 2006 non-final office action".
"499.074US2 May 3, 2007 final office action".

* cited by examiner

MAINTAINING PROCESS GROUP MEMBERSHIP FOR NODE CLUSTERS IN HIGH AVAILABILITY COMPUTING SYSTEMS

CROSS-REFERENCE TO RELATED APPLICATIONS

This application claims the benefit of U.S. Provisional Application No. 60/189,864, entitled "HIGH AVAILABILITY COMPUTING SYSTEM AND METHOD" and filed Mar. 16, 2000, which is hereby incorporated herein by reference.

FIELD

The present invention is related to computer processing, and more particularly to systems and methods for maintaining membership information in high availability systems.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, 2001, Silicon Graphics Incorporated, All Rights Reserved.

BACKGROUND

Companies today rely on computers to drive practically all aspects of their business. Certain business functions can survive intermittent interruptions in service (i.e. interruption in service availability) while others cannot.

Service availability can be defined by the following example. Consider a web service implemented by a set of web servers running on a single system. Assume that the system suffers an operating system failure. After the system is rebooted, the web servers are restarted and clients can connect again. A failure of the servers therefore appears to clients like a long latency.

A service is said to be unavailable to a client when latencies become greater than a certain threshold, called critical latency. Otherwise, it is available. A service is down when it is unavailable to all clients; otherwise, it is up. An outage occurs when a service goes down. The outage lasts until the service comes up again.

If downtime is the sum of the durations of outages over a certain time interval D=[t, t'], for a certain service S, service availability can be defined as:

$$\text{avail}(S) = 1 - \text{downtime}/(t'-t)$$

where t'−t is a large time interval, generally a year. For instance, a service which is available 99.99% should have an yearly downtime of about an hour. A service that is available 99.99% or higher is generally called highly available.

Service outages generally occur for two reasons: maintenance (e.g. hardware and software upgrades) and failures (e.g. hardware failures, OS crashes). Outages due to maintenance are generally considered less severe. They can be scheduled when clients are less active, for instance, during a weekend. Users can get early notification. Downtime due to maintenance is often called scheduled downtime. On the other hand, failures tend to occur when the servers are working under heavy load, i.e. when most clients are connected. Downtime due to failures is often called unscheduled downtime. Some time service availability is measured considering only unscheduled downtime.

Vendors often provide figures for system availability. System availability is computed similarly to service availability. The downtime is obtained by multiplying the average number of system failures (OS crashes, HW failures, etc.) by the average repair time.

To date, attempts to ensure high availability of mission critical applications have relied on two approaches. Applications have been made more available either through the use of specialized fault tolerant hardware, through cumbersome changes to the applications or to the environment in which the applications run.

One example of the approaches described above is referred to as server replication. There are several approaches to server replication. The most popular are active replication and primary-backup. However, hybrid approaches are also common in practice.

Active replication, also called state-machine, requires clients to post their requests to all replicas. Each replica processes the invocation, updates its own state, and returns the response to the client. The client waits until it receives the first answer or a majority of identical responses.

This technique is attractive because replica crashes are transparent to clients. A client never needs to reissue a request or wait for a timeout. If a server or a set of servers fail, latency does not increase. However, in the absence of failures, latency is negatively affected by the redundant messages and extra processing that this approach requires.

In the primary-backup approach, one replica is designated as primary while all others are backups. Clients send requests to the primary. If the primary fails, a failover occurs; and one of the backups takes over. The client must send all pending requests to the new primary.

With the primary-backup approach, requests can be lost. Additional protocols must be employed to retry such lost requests. The primary-backup approach, however, involves less redundant processing and less messages than active replication. Therefore, it is more prevalent in practice.

Because clients can only post requests to the primary, the service appears to be down while failover is happening. This time period is called failover time. Different flavors of primary-backup techniques yield different worst-case failover times. At one end of the spectrum is the case in which all the requests are managed only by the primary. Backup copies are not updated. When the primary crashes, a new primary is started. The new primary is initialized with the state of the failed primary.

As an example, consider a network that contains two server nodes, $N_1$ and $N_2$. A database server runs on node $N_1$. All the database files are located on storage that is accessible from both nodes. When $N_1$ crashes, $N_2$ starts a copy of the database server. The server initiates recovery. When recovery has terminated, clients reconnect to the database server now running on node $N_2$.

This technique requires no messages between primary and backups. Failover time, however, can be long. In the worst case, failover time is comparable to restarting the service on the same node. This technique is termed primary-restart.

On the other end of the spectrum, the primary system constantly updates the backup copies. The main benefit of this technique is short failover time. Replicas are kept up to date;

therefore, there is no need to recover. The main drawback is the number of messages exchanged by the replicas.

In general there is a trade-off between message processing overhead and failover time: the lower the overhead (fewer messages sent), the longer the failover time. Similarly, the higher the overhead, the faster the failover. If the goal is to minimize latency in the absence of failures, the first choice is better. If the goal is to minimize service downtime, the second choice is better.

Hybrid replication lies somewhere between active-replication and primary-backup. In one hybrid replication approach, clients post their requests to any of the replicas. All replicas are equivalent. While processing requests, replicas exchange messages and coordinate state updates. After the request has been processed, the replica that received the original request replies to the client.

Under such an approach, when a replica fails, the client sends the request to another server. There is, however, no guarantee that service will be immediately available. In most situations, the surviving replicas will not be able to satisfy some client requests until some number of recovery actions has taken place. Therefore, the main benefit of the hybrid technique is the ability to distribute requests to several replicas.

As can be seen from the discussion above, the high availability approaches used in previous systems increase the costs to the organization of running the applications. In addition, certain approaches to making applications more available increase the risk of introducing errors in the underlying data.

Thus, what is needed is a system and method of increasing the availability of mission critical applications which reduces the dependence on specialized hardware and operates with low overhead, yet assures data integrity.

SUMMARY OF THE INVENTION

To address the problems stated above, and to solve other problems which will become apparent in reading the specification and claims, a high availability computing system and method are described. The high availability computing system includes a plurality of computer nodes (for example, a server system) connected by a first and a second network, wherein the computer nodes communicate with each other to detect server failure and transfer applications to other computer nodes on detecting server failure.

According to another aspect of the present invention, a system and method of maintaining high availability in a server cluster having a plurality of nodes is described. A group communications service, a membership service and a system resource manager are instantiated on each node and the group communications service, the membership service and the system resource manager on each node communicate with other nodes to detect node failures and to transfer applications to other nodes on detecting node failure.

DETAILED DESCRIPTION

Figure 1:
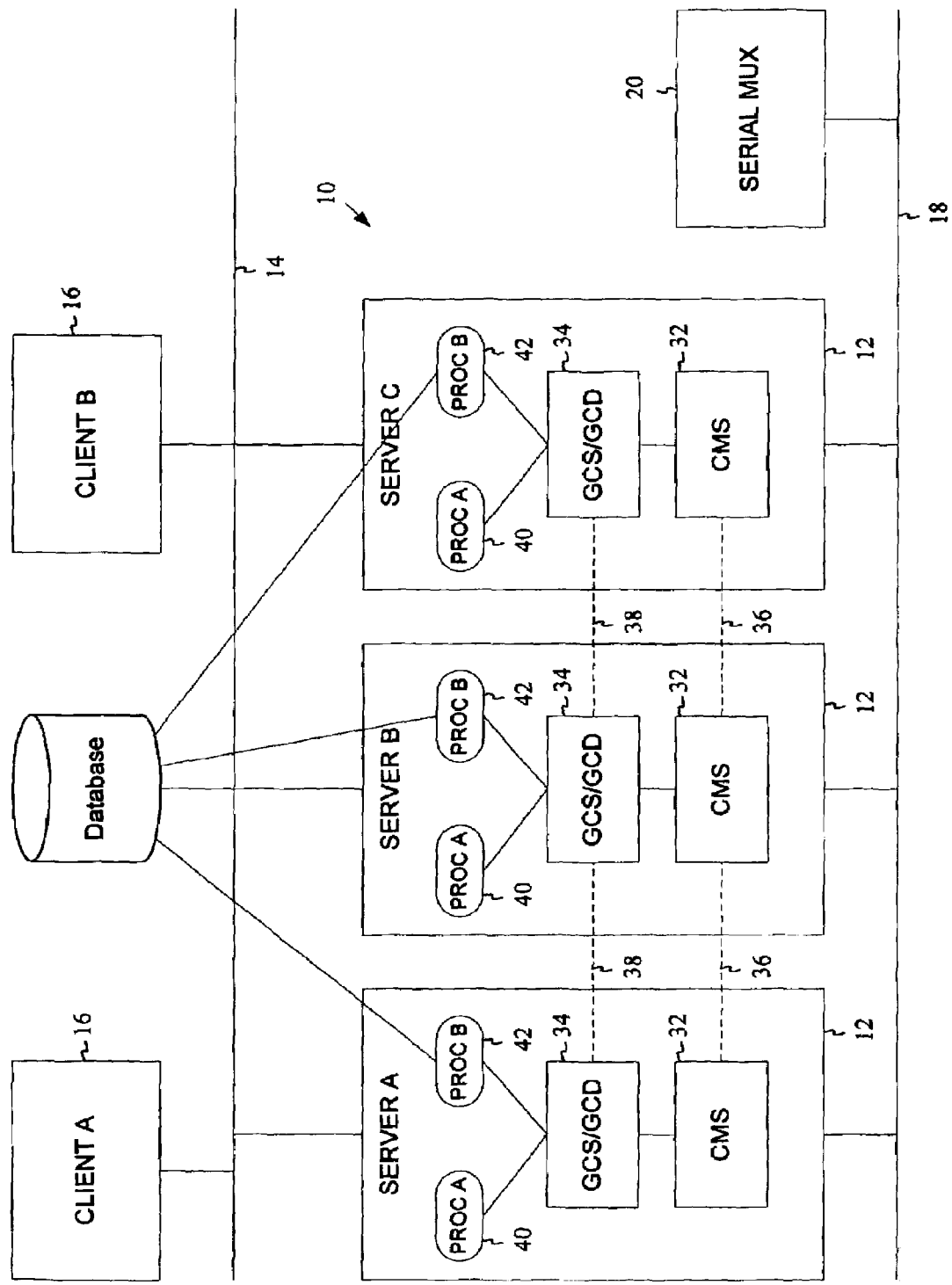
FIG. 1 is a block diagram showing components of a network operating environment in which different embodiments of the invention can be practiced.

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed description that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

DEFINITIONS

A number of computing terms will be used throughout this specification. In this specification, a client-server environment is one in which a set of users operate on a set of client systems connected through a network to a set of server systems. Often, applications within a client-server system are divided into two components: a client component and a server component. A process running the client component of the application is called a client; a process running the server component is called a server. A process can be either multithreaded or single threaded.

Clients send requests to servers and collect responses from them. Not all servers can satisfy all requests. For instance, a class of Oracle database servers might be able to satisfy requests regarding the employees of a company, while another class might be able to satisfy requests regarding the company's products.

Servers that are able to satisfy the same type of requests are said to be providing the same service. The time interval between the event of posting a request and the event of receiving a response is called latency.

A cluster is a group of computers (or computing systems). A computer within a cluster is called a node. Nodes in a cluster run their own copy of the operating system and are largely independent from each other. When one node fails, other nodes are left intact and able to operate.

A process is faulty in an execution if its behavior deviates from that prescribed by the algorithm it is running; otherwise it is correct. The same definition applies to nodes also. Such deviations can be caused by the following:

Crash: a faulty process stops prematurely and does nothing from that point on,

Send Omission: a faulty process stops prematurely and does nothing from that point on or intermittently omits to send messages it was supposed to send or both, Receive Omission: a faulty process stops prematurely and does nothing from that point on or intermittently omits to receive messages sent to it or both, General Omission: a faulty process is subject to send or receive omissions or both, A process subject to timing failures can fail in one or more of the following ways:

Omission: it commits general omission failures,

Clock: its local clock drift exceeds the specified bounds,

Performance: it violates the bounds on the time required to execute a step,

Let S be the set of all the nodes in the cluster. We assume there is a total ordering relation between the nodes in S. Let N be the number of elements in S.

Let R be a relation in SxS such that ni R nj iff $n_1$ and nj are correct and ni can receive messages from nj R is reflective but may not be symmetric or transitive. Notice that R changes with time. To make the following definitions more readable we have chosen to hide the time dependency from the notation. The relation R and each of the entities derived from R are implicitly time dependent.

A set $r_i$ is a subset of S which includes all the nodes in S for which (ni, nj) is an element of R. The set $r_1$ is also called receive set of ni.

Let $R^{-1}$ be the relation such that: ni $R^{-1}$ nj iff nj R $n_i$.

Let Y be the relation R intersected with $R^{-1}$. Y is reflective and symmetric.

A subset of 5, C is said to be a clique of S iff for each pair of elements in C, ni, nj it holds $n_1$ Y nj. Given S and R there are potentially many different cliques.

The relation X is defined as X=R* intersected with $(R^{-1})$* where X represents the relation "can directly or indirectly send and receive to/from". In other words (ni, nj) belongs to X if there is a path (which may include intermediate nodes) where a message can travel from ni to nj and back from nj to ni.

Consider a service whose servers are distributed on a set of N (where N>1) nodes in a cluster. For the service to be unavailable, all of the N nodes must fail at the same time. Since most of system failures are statistically independent, the probability of such an event is $p^N$, where p is the probability of a failure of a single system. For example, given a cluster of 2 nodes with availability of 99.7% for each node, at any given time, there is a 0.3% or 0.003 probability that a node is unavailable. The probability of both nodes being unavailable at the same time is $0.003^2$=0.000009 or 0.0009%. The cluster as a whole therefore has a system availability of 99.9991% or (1-0.000009). System availability of a cluster is high enough to allow the deployment of highly available services.

In a clustered environment, servers providing the same service are often called replicas. Replicas are distributed on different nodes. If one node fails, replicas running on other nodes continue to provide service.

The server component of an application is said to be distributed if servers providing the same service operate concurrently on different nodes in the cluster. An example of a distributed server is a distributed database server such as Oracle Parallel Server (OPS). In such a distributed database server, requests can be posted to any server on any node running the service.

An application is termed multi-server if its server component is distributed; otherwise, the application is single-server.

Unfortunately, multi-server applications are more the exception than the rule. Most of today's client/server applications are single-server. Changing these servers to become multi-server, so they can provide highly available services, is typically not an option. In fact, adding support for server distribution often requires rearchitecting the application.

Fortunately, primary-restart replication can be implemented without changing the server component. However, primary-restart requires the ability to recover the state of the failed server, so that state can be used as initial state to the new application instance. Assuming that all the interesting state is placed on storage, state can be recovered by allowing multiple nodes access to the same shared storage.

By applying the primary-restart technique, a single-server application can be made highly available in a cluster environment with no change to its server component. Oftentimes, however, the primary-restart technique is not transparent to clients. That is, when a failure occurs, a client must try a different replica. Unfortunately, the client component is just as unchangeable as the server.

For example, assume a single-server application has been replicated on nodes $N_1$, (primary) and $N_2$ (backup) using a primary-restart scheme. On a takeover, highly available filesystems, IP addresses, and applications are migrated from $N_1$ to $N_2$. To the client, the takeover appears as if node $N_1$ has died and rebooted quickly. Pending operations are most likely lost. State that was committed to storage is, however, recovered while and state that was not committed is lost.

Because clients are capable of dealing with a server reboot, it follows that they are able to deal with a takeover. In this environment, both the client and the server components of the application run unchanged while clients enjoy potentially highly available services.

As noted above, a major disadvantage of the primary-restart model is long failover times. If the average failover time is greater than the critical latency, the service will appear to be down. This means that service downtime can never be smaller than the average number of system crashes multiplied by the average recovery time. This is important because it shows that server replication techniques based on the primary-restart approach do not work well if systems have frequent OS crashes or hangs. The duration of an outage due to an OS crash (excluding core dump time) is generally comparable to the takeover time, during which the service is unavailable. This assumes a situation where application recovery/startup is non-trivial, like with database recoveries. Hence, service availability is almost as bad as single system availability. Primary-restart techniques, however, work well if system outages are relatively rare and last a long time (e.g., when a hardware component fails and needs replacement)

As noted above, primary-restart replication may require that storage be accessible by multiple nodes. Applications supporting distributed servers often have similar needs. For instance, Oracle Parallel Server requires all disks to be accessible from all nodes within a cluster. In a typical cluster configuration, disks are physically connected to multiple hosts. This technique, called multi-hosting, is currently supported for SCSI and Fibre Channel disks.

In these environments, disks typically support logical volumes. A logical volume, or simply a volume, is an object that behaves like a disk partition, but its storage can span several disk devices. Because data is usually stored in volumes, shared access to disks is not enough; volumes must be sharable as well.

Unfortunately, it can be difficult to concurrently share volumes containing filesystems. In some systems, mounting the same XFS filesystem from two different nodes will cause OS crashes on both nodes and possibly data corruption to the filesystem. Nodes in a cluster must, therefore, carefully coordinate access to volumes containing filesystems (a concept termed "sequential sharing").

In this environment, it helps to look at all the sharable volumes in the cluster as a single pool of storage resources. All the network interface cards connected to the same network can be viewed in the same way. With the exception of raw volumes, access to these resources must be coordinated among nodes.

Highly available services can be provided in two ways. First, a multi-server application using built-in or highly available services, can directly provide HA services. In the alternative, a single-server application layered on top of multi-server highly available system services can provide equivalent HA services. In other words, a single-server application may depend on a special application that uses the multi-server application discussed above.

Highly Available Membership Services for Multi-Server Applications

As noted above, the server component of a multi-server application works well in a cluster environment. It is desirable for system vendors to provide some basic services that are generally assumed to be hardware or OS dependent. Among these services are node cluster membership and process group membership.

A node cluster membership can be defined as the set of nodes in a cluster that work correctly. A node cluster membership service (CMS) is a set of tools which allows processes to be notified when nodes start working correctly or stop working correctly. Servers of multi-server applications rely on the membership service for notification of failures and initiation of recovery. Let us assume that OPS is running on node $N_1$ and node $N_2$. When $N_1$ crashes, OPS on node $N_2$ is delivered a new membership, not including $N_1$. OPS on $N_2$ performs the recovery.

Start notification is also desirable because it allows the application to redistribute the load by starting services on the most recently added node members.

Process membership will be discussed next. Consider the following example: An OPS instance O runs on a cluster containing two nodes, $N_1$ and $N_2$. Let $S_1$ and $S_2$ be respective servers running on nodes $N_1$ and $N_2$. Let us assume $S_1$ crashes. The node membership service will not deliver a new membership because $N_1$ and $N_2$ are still working correctly, that is, the nodes are still running, it is the instance of a service on the node that has crashed. As a result, $S_2$ does not initiate recovery, 0 becomes unavailable.

The example above shows that node membership is not enough to catch server failures and start appropriate recovery. Applications like OPS need process level membership. Let us consider a group of processes, G, distributed on the nodes in a cluster. Processes are free to join and leave G. The list of processes joined to G is the membership of G. Faulty processes are forcibly removed from the group. A process membership service is a set of tools that allows processes in a group to get notified of changes in the group membership.

One embodiment of a high availability (HA) computing system 10 is shown in FIG. 1. System 10 includes two or more computing servers 12 connected over a network 14 to clients 16. In normal operation, servers 12 in a cluster can be active, working as if they were independent servers. In the event of a failure, however, the surviving server 12 takes over the services of the failed system, transparently fulfilling requests from clients 16 on network 14. In one embodiment, system 10 supports heterogeneous clusters of servers 12, preserving the investment in existing computing infrastructure.

In the embodiment shown in FIG. 1, the two servers 12 are connected to both a public network 14 and a private network 18. Clients 16 use public network 14 to access services from the cluster. Software running on each server 12 use private network 18 to exchange heartbeat and other control messages. In one embodiment, private network 18 comprises a serial communication network with a serial multiplexor 20 interconnecting the servers 12 to the private network 18. In the event of a server or application failure, the surviving server 12, if appropriately configured, assumes the public network address of the failed server 12 and answer requests from clients 16 on network 14. In one embodiment, clients 16 perceive the failover process as a rapid reboot of the failed primary server.

Each of servers 12 run Cluster Management Services (CMS) 32 and Group Communication Services (GCS) 34. In some embodiments, a single instance of a process providing Group Communication Services is referred to as a Group Communication Daemon (GCD). The CMS and GCS services will now be described in further detail in the sections that follow.

Cluster Membership Services

In some embodiments of the invention, the cluster membership service 32 comprises three major components: a Membership Server, a library that defines the interface to the application, and a set of administrative commands to control the behavior of the Server.

The main component of the Membership Service Is the Membership Server. Typically there is one Server per node in the cluster. These Servers monitor each other by exchanging heartbeat messages and are responsible for providing the application with the information about the status of the nodes in the cluster (UP, DOWN). They are also responsible for making sure that the information is the "same" on each node.

An application that wants to use the Membership Service links with Membership Service Library (not shown). The Library implements the communication interfaces between the Membership Server and the application. The library contains three sets of interfaces: (1) a set of interfaces to register/unregister with the Membership Service, (2) a set of interfaces to extract information from the Membership Server, (3) a set of interfaces to control the behavior of the Server. Through the register/unregister interface an application may chose to receive asynchronous notifications when the Server detects changes in the status of the nodes in the cluster.

The third component is a set of commands that may be used by the System Administrator to control some of the policies implemented by the Membership Server.

Instances of CMS 32 communicate with one another using Cluster Membership Protocol 36. An instance of a CMS service is also referred to as a Cluster Management Daemon (CMD). As far as the Cluster Membership Service is concerned, nodes are represented by the CMD processes that run on them. The failure of such a CMD is interpreted as the failure of the node. As an example of one aspect of the operation of a CMD, in order to be able to reach agreement the servers may chose to follow a two-phase commit protocol. In that case the two-phase commit protocol will be a component of the Cluster Membership Protocol 36. Membership Protocols usually contain three phases:
1. Initialization phase. This phase takes place upon the occurrence a "membership event" that may cause a new node to join the group, this phase is generally followed by an agreement phase (see below),
2. Monitoring phase. All the nodes in the group monitors for other's nodes failures,
3. Agreement phase. All the nodes in the group attempt to reach an agreement on the group membership.

Most of the time the nodes in the cluster will be executing in the Monitoring Phase. Initialization and Agreement phases are entered upon the occurrence of a membership event. During the Monitoring phase the nodes in the cluster will be sending and receiving heartbeat messages. In a large configuration it is desirable to minimize the number of heartbeat and other control messages.

In some embodiments, cluster membership protocols 36 use incarnation numbers to distinguish between different instances of the Cluster Membership Server on the same node. The incarnation number is generally saved in non-volatile storage (disk or NVRAM).

In one embodiment of the invention, the Cluster Member Protocol 36 typically uses $(N^2)$ heartbeat messages and requires in average $(N^2*2^N)$ steps to compute the Membership. It's therefore only suitable for small configurations (up to 16 nodes). In some embodiments, the protocol includes the following features:
Use the same message type for initialization, heartbeat and agreement,
Heartbeating is one way only, heartbeat messages are sent to all the members in the set S of all nodes in a cluster (in the Membership or out),
Heartbeat messages are used to carry around initialization and agreement messages,
Each node acts as a message forwarder, in this way agreement messages can be seen and acknowledge by nodes not directly connected to the originator,
All Membership changes are initiated by a single node called leader, the leader proposes a new copy of the relation R, collects replies and declares the new Membership, all the other correct nodes adopt the new membership,
The algorithm used to compute the Membership from S and R requires enumeration of all the possible subsets of S $O(2^N)$ In absence of link failures the protocol satisfies the following properties:
Stability of Views. After a node joins a group it stays joined to that group until the process fails or starts, i.e. correct nodes should not arbitrarily leave their group.
Reflexivity. If joined(n) then n belongs to members(n), i.e. if a node is joined to a group its view of the group should include at least itself.
Agreement on History. Let $n_1$, nj be two nodes that stay correct through a certain time interval. Assume that during that time interval $n_1$ and nj are joined to the same group J. Let Ji and Jj be the next two groups joined by $n_1$ and nj after leaving J. Then $J_i$=Jj. In other words, all the correct nodes are joined to the same sequence of groups as time passes.
Agreement on Membership. If joined(ni) & joined(nj) and group($ni_1$)=group(nj) then the two nodes have the same view of the membership members(ni)=members(nj).
Bounded Join Delays. There exists a time constant D such that if a node starts at time $T_0$ and stays correct until time $T_0$+D, then by time $T_0$+D the node is joined in a group that is also joined by each other node that was correct throughout [$T_0$, $T_0$+D]. In other words, a node that starts will be admitted to the group within a bounded time interval.
Bounded Failure Detection Delays. There exists a time constant D such that if a joined node ni fails at time $T_0$ then each node that stays correct throughout [$T_0$, $T_0$+D] joins at time $T_0$+D a group J such that ni doesn't belong to J. In other words, there is a bound on the time needed to detect node failures.

The protocol deals reasonably well with disconnected networks.

The protocol identifies each node in S by a node id. It is desirable that node id's are a dense set of integers Oc=I<=N. Where N is the number of nodes in the cluster. Subsets of S are represented by bitmaps where the bit in position i is 1 means that the node with nodeid i is part of the subset.

Each correct node in the cluster sees a sequence of Membership changes. The first element of the sequence is the first Membership delivered on that node. The number of Memberships seen by a correct node is called the age of the node. The protocol uses age as the total ordering relation among nodes. In the following "A" will indicate the ordering relation based on age. Node id's ordering is used to break ties among nodes with the same age. In some embodiments of the protocol, the leader is defined as the node with the highest age. This definition implies that a new leader is elected only when the current leader must be excluded from the best clique, where a clique is defined as a node joining the Membership never causes the leader to change. the best clique is the one that contains the most elements. Again the total relation defined by the age is used to select the best clique among those that have the same number of elements. A non-leader node is called a follower.

Each instance of CMD is uniquely identified by an incarnation number. When CMD starts up, it reads the last incarnation number from a file, increments it and writes it back to the file. The incarnation number is used by the other CMD's in the cluster to identify a specific instance of CMD on a specific nodes. The incarnation number is included in each outgoing message. By checking the incarnation number in the incoming message, CMD is able to distinguish between a node that suffered a performance failure (which should not be reintegrated in the membership) from a node that has actually restarted (in the first case the incarnation number would not have changed). It also makes easy to identify the "quick reboot" case in which a node was rebooted before the rest of the CMD's had a chance to remove it from the Membership (due to a long timeout). In this case a new Membership should be generated, notice that the new Membership will contain the same set of nodes with different incarnation numbers. In this environment a Membership is defined by the set of incarnation numbers of the correct nodes.

In this Protocol everything is centered upon the view that each node in the cluster has of the relation R. Let $R_i$ be the view of the relation R on node $n_i$. Each node is independently able to build the part of the relation Ri that has $n_i$ as a first element. For the rest of the relation, node $n_i$ depends on the other nodes in the cluster. A first copy of the relation is downloaded to $n_i$ during the initialization phase. All the messages exchanged by the Cluster Membership Servers include a full picture of the relationship $R_j$ as seen by the sender $n_j$. During the monitoring phase each node $n_i$ is able to detect changes in its receive set. A change in the receive set translates to a change of $R_i$. It's easy to see that any Membership Event can be reduced to a change in $R_i$. Because each node sends its copy of $R_i$ to all the other nodes in the cluster, the leader eventually sees the change and starts the agreement protocol. The first part of the protocol ends when all the correct nodes have the same view of R. Then the leader computes the best clique and sends it to all the nodes.

As noted above, the main component of the Cluster Membership Service is the Cluster Membership Daemon. In some embodiments, the Cluster Membership Daemon is responsible for running the whole protocol and is represented by the Membership Daemon that runs on it. The daemon maintains in an internal variable its current view of the Membership. The daemon is said to have delivered a new Membership when the value of that variable is changed.

Each CMD sends messages to other CMD's by invoking a broadcast primitive. The destination of the broadcast are all the nodes in S except the originator. Typically, the broadcast primitive is the only way CMD sends messages. The semantic of the broadcast primitive are very weak. Message can be lost and there are little guarantees on the ordering at the receive end. Current implementation of the daemon uses UDP/IP, however any datagram transport can be substituted. The broadcast primitive prepends a header to the message. As stated above CMD uses one type of message. Each message contains useful information and at the same time can be considered as an "I'm alive message" from the sender. CMD is required to periodically broadcast a message. The interval between broadcasts is a configurable parameter.

Messages are organized in two main sections:
header section
per node data

The header includes (among other fields) the node id of the source, the incarnation of the sender and a sequence number, the incarnation number are used to determine if the sender can be trusted (message coming from old incarnations are discarded), the sequence number is used to eliminate duplicates. The per node data section is discussed in detail below.

One aspect of the data structure used by some embodiments of the invention is called Node Data Area (NDA). CMD allocates and manages one NDA for each node in S. The NDA relative to the local node (the node where CMD is currently running) is called local NDA. A full copy of these NDA structures is included in each outgoing message. The local NDA is updated when CMD detects an event on the local node (e.g. a node time out), all the other NDA's are updated upon reception of a newer version as part of an incoming message. Because there's one NDA for each of the nodes in S we will think of the set of NDA's like an cluster (even though CMD allocates them differently) and use the notation: NDA[i] to identify the NDA relative to node ni.

In some embodiments, to determine if a new version of some node's NDA[i] has been received, CMD uses a set of sequence numbers (one for each of the main components of the NDA). When a message is received CMD looks at all the NDA's (in the message) and compares their sequence numbers with the numbers stored in the internal NDA's. If the incoming NDA[i] has a higher sequence number for any of the main components, the internal NDA[i] is updated with the content of the incoming NDA[i] and CMD takes the appropriate set of actions. Since a copy of the internal NDA's is included in each outgoing message, the newer NDA is propagated to more and more nodes. This form of indirect propagation allows CMD to reach agreement with all the node directly or indirectly connected (the nodes connected by the relation X as defined in the previous Chapter). The three main sections in the NDA are:
membership section,
receive-set section,
checkmark section Three different sequence numbers are associated with each sections. The membership section includes an cluster of incarnation-numbers (one per node) and a sequence number. This section is used to distribute information about the current membership. The receive-set section is used to distribute the view of the relation R it contains a bitmap and a sequence number. As described above the bitmap is used to represent a set. The checkmark section is used to collect acknowledgments and it's described in detail in following. Notice that NDA's travel as part of the regular ping messages and therefore they are re-transmitted continuously. This protects the protocol against any message loss due to omission failures.

As discussed above, newer versions of the NDA are propagated to the rest of the nodes. Suppose that CMD on node ni wants to make sure that its newly modified version of the NDA[i] has been seen by all the correct nodes (remember that each outgoing message contains a full copy of all the NDA's). The checkmark section is used for this purpose. It contains a bitmask and a sequence number (just like the receive-set section). The first step in this process is to determine the "target set" of nodes. CMD uses the receive-set sections in the NDA to compute the relation X and to find the set of the nodes that are directly or indirectly connected. There's no point in including in the "target set" nodes that cannot be reached. Nodes in the "target set" are considered to be correct and therefore node nj will wait for their acknowledgment. Once the "target" set has been computed, CMD increments the sequence number in the checkmark section of its NDA[i] and sets the bitmap (again in the checkmark section of NDA[i]) to include itself and nothing else. Because all of the NDA's are included as part of each outgoing message the new checkmark section is sent to all the nodes in the cluster. Let's now move to node nj (j!=i). When CMD on node nj receives the message from node ni it looks at all the NDA's in the message and notices that NDA[i] has a new sequence number in the checkmark section, it then updates its internal NDA[i] with the new NDA[i] and it adds itself to the bitmap in the checkmark section of NDA[i]. The next message from nj will contain the new copy of NDA[i]. Upon receiving the message from node nj CMD on node ni will notice a new bit in the bitmap that confirms that the new NDA[i] has been seen by node nj. Eventually the checkmark section will contain all the nodes in the "target set". Thus the NDA propagation mechanism described in the previous section allows checkmark acks to be propagated to indirectly connected nodes. Another desirable feature of this mechanism is that another checkmark-ack request can be initiated at any time, even if there's a pending one. The most relevant checkmark-ack request is the last one. Once again the NDA's diffusion mechanism (continuous retries, see end of the previous section) protects the checkmark-ack protocol against omission failures.

As mentioned above, the checkmark-ack protocol is used to make sure that all the other correct nodes have had a chance to look at the new copy of NDA[i] created by node ni. In more formal terms: if node $it_1$ started at time $T_1$ a checkmark-ack request that terminated successfully at time $T_2$ then all the nodes in the Membership at time $T_1$ that stayed correct throughout $[T_1, T_2]$ must have seen node's ni view of $R_i$ and its Membership at time $T_1$.

By looking at the message header the CMD in some embodiments is able to determine if a message should be discarded using the following criteria:

Messages in which the incarnation number is less than the sender's stored incarnation number are discarded, Messages in which the sequence number is less than the sender's stored sequence number are discarded, Messages from a sender that is not currently in the receiver's receive set or Membership, are discarded if their incarnation number is less or equal to the stored incarnation number for that sender, All the other messages are considered valid.

In this section we will describe what happens when a new Membership is generated. Let's first assume that the cluster is in stable state and all the correct nodes agree on a Membership M~, this implies that all the correct nodes agree on their age and their leader. The event that triggers a Membership change is a change in the receive set of a correct node. Three types of changes may occur:
  a. one or more node(s) are removed from the receive set,
  b. one or more node(s) are added to the receive set,
  c. a combination of the above two After noticing one of the above events CMD enters a transition phase that ends when a new membership is delivered. In some embodiments, CMD performs an election each time there's a change in the receive-set. This is not strictly necessary and in alternative embodiments, the protocol can be optimized to avoid it. This phase is referred to as the election phase. In the next phase the leader computes the new membership while followers wait for the leader to distribute the new membership, this phase is called computation phase. At the end of the computation phase the leader internally delivers the new membership, the new membership is then distributed to all the follower nodes during the distribution phase, which ends when all the correct nodes have delivered the new membership.

The first step in the election phase is to reach agreement on the relation R. It starts with all the correct node sending a checkmark-ack request. It's easy to see that, in absence of further receive-set changes, all the correct nodes will have the same picture of R upon successful termination of their checkmark-ack request. The new leader is the maximum node in the total ordering relation A (age) which also belongs to the set of directly/indirectly connected nodes. Given that all the correct nodes agree R and A, all the correct node will select the same leader. if further receive-set changes occur during the election phase, new checkmark-ack requests are sent, effectively restarting the election phase. Generally a few restarts should make sure that all the nodes agree on the same leader. There's however one case in which two or more nodes might decide to be leaders at the same time. However, as discussed below, the protocol is able to deal successfully with this situation.

The first step in the computation phase is for the leader to check whether the set of directly/indirectly connected nodes has a "quorum". The quorum value is generally set to N/2+N % 2 (where N is the total number of nodes in the cluster), if the set of directly/indirectly connected nodes does not have a quorum, the leader stalls waiting for a change in the quorum value or a change in the receive-set. If the quorum value decreases to a low enough value (admin intervention), the leader proceeds to the next step. Otherwise, if the receive-set changes all the nodes go back to the election phase. The last step is the computation of the new best Clique for the relation R.

The distribution phase completes the membership transition. During this phase follower nodes receive the new membership from the leader and deliver it.

During the transition phase leaders are required to satisfy to the following requirement before delivering any new membership: a leader CMD is not allowed to deliver a new Membership until the current Membership has been acknowledged by all the directly/indirectly connected nodes.

From the very beginning CMD starts executing the Membership Protocol. That is it sends broadcast messages, it receives and processes messages from other nodes and it propagates/acknowledges checkmark-ack requests. It's not however allowed to initiate a checkmark-ack request. During this phase messages sent by the node may contain partially valid information. In the very first message, all of the NDA's are empty with the only exception of the local NDA. The local NDA contains the sender's receive set that is initialized to contain all the nodes in the cluster. The senders Membership view is initialized with an invalid value. During this phase CMD is also allowed to "time-out" nodes from which it's not receiving any message. CMD leaves the initialization phase when one the following becomes true:
  some other node delivers a Membership that includes the new node,
  a start-up timeout expires.

In the first case CMD delivers its first Membership. In the second case CMD computes the leader which will eventually deliver its first Membership.

The next phase occurs when a new node ni is detected by a node nj already belonging to the group. At first, the node nj sees a new node being added to its receive set. This event causes nodes to enter the transition phase. At the end of the transition phase node nj delivers a new Membership containing ni The protocol is very similar for a node becoming inactive. Again a node that is currently part of the Membership will notice a change in its receive set (triggered by a timeout: "no message received from node n in the last "TIMEOUT" seconds). This will cause the nodes to enter the transition phase and eventually deliver a new Membership which will not include the timed out node.

A link failure is perceived by the node as a change in its receive set. CMD follows exactly the same steps. Some times a temporary link failure may cause a node to be excluded from the Membership. It's important to notice that once excluded from the Membership a node must acquire a new incarnation number to have a chance of being readmitted to the Membership.

This section has described a cluster membership protocol for high availability system. The next section will discuss group membership services.

Group Membership Services

Still referring to FIG. 1, Group Communication Services (GCS) 34 is a distributed service layered on top of the Cluster Membership Service (CMS) 32. As described above, CMS 32 provides the abstraction of a cluster of nodes (a collection of clustered computers). CMS presents a consistent view of node membership in the presence of node and network failures. GCS, in contrast, provides the abstraction of process groups—collections of processes distributed across a cluster, cooperating to provide a distributed application service. In some embodiments, the GCS presents applications with:
  a consistent view of group membership in the presence of process failures and changing node membership.
  an atomic messaging service.

Distributed applications use GCS to be notified of the normal termination or abnormal failure of individual application instances running on a cluster node. While distributed applications must still undertake the task of instance recovery and reintegration, GCS relieves applications from the task of monitoring instance existence and liveliness in a distributed environment. GCS also provides a reliable communication service to simplify instance recovery and reintegration.

In some embodiments, GCS is implemented as a collection of GCS instances, one instance being active on each node of the cluster. The terms GCS instance and Group Communication Daemon (GCD) are used interchangeably throughout this specification. GCD itself is a distributed application which uses Cluster Membership Services 32 to maintain a consistent view of node membership across all instances. An application or client process joins a GCS group by registering with the local GCS instance. It leaves the process group by unregistering with the local GCS instance. In both cases, all group processes have a consistent view of group membership.

GCS operates in the context of a cluster as defined by CMS 32. If CMS 32 excludes a node from the CMS membership group, GCS 34 will exclude all processes running on the excluded node from their respective GCS groups. In some embodiments, GCS is a critical client of CMS, i.e. if GCS is not running on a node, or fails, CMS will exclude the node from the CMS membership group.

GCD monitors the existence and liveliness of all processes within a group. Group process failures trigger a group membership change, with the failed process being reported as exiting in an unknown state. Note that the specification uses the terms group member and application instance interchangeably since they refer to the same entity—an application process registered with GCS 34 at a server 12.

The group membership protocol 38 propagates group memberships across the cluster nodes using an ordered reliable broadcast. Ordering ensures that if two different GCS instances 34 each try to propose a membership change the changes are processed in the same order at every GCS instance. Reliability ensures that the membership change is either accepted in its entirety, or not at all; i.e. if the GCS instance at any one node receives the message, GCS instances at all nodes are guaranteed to have received it.

GCS 34 exposes an ordered, atomic messaging service to processes belonging to its groups. For the purposes of this specification reliable is defined to mean a message satisfies at least the following three properties:

1. Validity: if a correct process receives a message 'in', all correct processes receive 'in'.
2. Agreement: if any correct process receives 'in', all correct processes receive 'in'.
3. Integrity: for any message 'in', every correct process receives 'in' once, and only if it has been broadcast.

Informally, these three properties can be restated as: "all processes receive the message or none receive it and there are no spurious messages Also within this document, atomic is assumed to mean, in addition to satisfying the reliable property defined above, a message also satisfies the following property:

Atomicity: if correct processes P and Q receive message 'm1' and 'm2', then P receives 'm1' before 'm2' if and only if Q receives 'm1' before 'm2'.

Informally, this property can be restated as: "all processes receive all messages in the same order".

In addition, GCS 34 ensures that the same atomicity exists between messages and memberships. Another way to put this is each process in a group membership is presented with the same view of all participants in the group. This view may change over time but between two consecutive views, all participants in both views receive the same messages. Thus, every message is delivered within the view in which it was sent. This notion is generally referred to as virtual synchrony.

Informally, a total ordering is imposed upon all GCD 34 messages, within a specific group membership, whether the messages originate from outside GCD 34 (client messages) or whether the messages originate from inside GCD 34 (membership changes).

The Cluster Membership Services 32 described above introduced the fundamental property of agreement on history (aoh). Group Membership Services 34 also enforces that agreement of history property with respect to group memberships. A detailed discussion of aoh is provided in the Cluster Membership Services section above, however the major implication of satisfying this property is that each and every group membership must be delivered to each correct process in the group, in the same order. Different processes in the group will not see different membership histories.

In some embodiments, GCS is implemented as a collection of GCD 34 processes, one process being active on each node of the cluster. Each GCD 34 process registers with the local CMS service 32 when the GCD 34 process starts. If CMS 32 reports the node to be part of a cluster membership, the local GCD 34 process completes its initialization. From this time forward, GCD 34 allows application instances to register themselves as belonging to a process group.

In what follows, the GCD 34 process that initiates a protocol is called the initiator. The GCD 34 process running on the oldest node in the cluster is called the coordinator. The identification of the oldest node in the cluster is provided by CMS 32, as described above. All GCD processes that are active during protocol execution are referred to as participants.

The delta protocol is initiated by a GCD 34 instance to add/remove a local application instance from a particular group membership when the application instance registers/unregisters with GCD 34 and to transmit an arbitrary message to other groups in the cluster. The membership changes actually form a subset of the general message set.

When a critical application instance exits without unregistering or fails to respond to monitoring in a timely fashion, the local GCD 34 may exit, causing the local CMS 32 instance to exit, which in turn causes the node the instances were running on to be physically reset. Exit or failure of a non-critical application instance is treated as an implicit unregister. The remaining GCDs on other servers 12 are notified of the change in the group's membership.

When CMS detects a node crash (i.e. exclusion of a node from the cluster membership group), each participant re-evaluates the identity of the coordinator.

Each participant opens a single connection to its next most younger sibling. Thus, all participants are connected in a ring, including the coordinator. One characteristic of the GCS protocol definition is that the ring is defined by the age of each node. In this way, rebuilding the ring in the presence of failures is fairly straightforward. Each node connects to its next younger sibling, except for the youngest node which connects to the coordinator. The coordinator is always the oldest node. Thus, the age of a node becomes a feature of the underlying CMS 32 service.

If the coordinator crashes, as determined by CMS, each participant re-evaluates the identity of the coordinator. If the coordinator crashes, the participants establish a connection with the new coordinator. If some other node crashes the ring is repaired by the preceding node connecting with the succeeding node.

Each GCS instance or GCD has an incarnation number associated with its current life. In some embodiments, this number is a monotonically increasing number, and is used to differentiate messages coming from different incarnations of a GCD on a given node. Each message originating from a node carries the incarnation number of that node's GCD. Incarnation numbers are used for several purposes, including:

To ensure First In, First Out (FIFO) treatment of messages originating at a node.

To identify duplicate messages.

To identify old messages, that can be safely thrown away. These are described in detail below.

The Delta Protocol

The delta protocol is used in some embodiments of the invention by GCD 34 to deliver ordered, atomic communications. These messages may be created by application instances and may contain arbitrary information, or they may be created by GCD 34 itself and may be used to deliver membership information to other GCS 34 instances in the cluster The Delta protocol can be summarized as follows. An initiator GCD node sends a message to the GCD coordinator node. The coordinator sends this message to the other GCD nodes in the cluster and waits for an acknowledgment from these nodes. This is the first phase or proposal phase. After receiving an acknowledgment, the coordinator sends out a commit message to the other GCDs 34 on servers 12 and then waits for acknowledgment of this message. The commit phase is the second phase. All messages within a specific group are serialized through the coordinator, allowing a global ordering of messages, within a group. Unlike the traditional two-phase commit algorithm, an arbitrary node may not abort either a proposal or a commit.

In order to guard against several types of failures, in some embodiments, each node maintains two data structures: a buffer to temporarily hold pending proposals and a buffer to temporarily hold commits. One proposal and one commit buffer is allocated for each group. In addition to these buffers, the coordinator node allocates a pending queue for each group. The protocol according to one embodiment of the invention, along with data structures and error cases, are described in the following 6 tasks. Tasks 1, 2, and 3 constitute the first phase of the protocol. Tasks 4, 5, and 6 constitute the second phase. In all of the following tasks, we assume GCS instance failures and node failures to be synonymous and we further assume that determination of a new coordinator is asynchronous and automatic.

1. Task 1: A GCS instance 34 (referred to as the initiator of the message) sends a message to the GCS coordinator. The initiator will resend the message if the initiator does not see a proposal for the message within some pre-defined period of time (see tasks 2 and 3). The message is acked by the initiator to its client (the originator of the message) when the initiator sees a commit for the message (see tasks 4 and 5). When the message is received by the coordinator, it puts the message in the pending queue of the coordinator. These failures are possible and considered:

a. Coordinator failure: The initiator will not see a proposal for the message and the message will be resent by the initiator after some pre-specified time has elapsed (to the new coordinator).

b. Initiator failure: If the message is in the coordinator's serializing proposal queue, the coordinator will not send out the message. The coordinator will filter out all the messages in the pending message queue from the initiator. If the message proposal has already been sent, the message will be delivered to all remaining GCD 34 nodes. Only after all servers 12 have seen this message will new memberships (including the membership containing the failed initiator) be delivered.

c. Application instance failure: A new process group membership message is sent by the initiator to the coordinator. At this point the app instance fails. The membership is delivered to all GCD nodes after which the initiator will deliver a second membership showing the application instance's change in status.

d. Lost messages: The message may only be lost when moving from initiator to coordinator. This defaults to case a above.

2. Task 2: The coordinator sends a proposal for the message (ostensibly the message) to the remaining GCD server nodes. The message is passed from one server node to the next. The message proposal loops back to coordinator after being passed on by all the nodes. Each of the nodes puts the message proposal in its proposal buffer. There is a proposal time-out for each message. If the time-out value is reached, the coordinator resends the proposal message. Servers 12 who have already seen the proposal message continue to pass it along, as many times as necessary. These failures are possible and considered:

a. Coordinator failure: If the message has been received by the next node (the new coordinator), the message proposal will be sent around by the new coordinator. If the proposal message has not been received by the new coordinator, the message is sent by the initiator after the "message-resend" time-out. The message is put into the serializing proposal queue of the new coordinator.

b. Other GCS instances 34 fail: This failure does not matter. A message to indicate the change in the process group membership is queued by the coordinator in its serializing proposal queue. This newest membership will be delivered sometime later.

c. A GCD 34 joins: The new GCD will ignore all messages until it has a client. Until that time, it merely acts as a conduit, passing along all messages.

When the initiator receives the proposal message, it can remove this message from its initiate queue. It does not need to initiate it ever again because this message is in the coordinator's proposal queue. In the case of the coordinator dying, it will also be in the new coordinator's proposal queue; this follows from the fact that this message is in this GCD's proposal queue, so it must be therein the proposal queues of all GCD's older than this GCD; one of these older GCD's or this GCD will become the new coordinator. If this GCD is the coordinator itself, then the case of the coordinator dying is a moot one.

When any non-coordinator GCD receives a non-duplicate proposal message (viz, the next message in that group), it flushes out its commit queue. The commit queue had stored the previous message (if any) to handle potential resends. However, once it receives the next proposal message, it implies that all GCD's have seen the previous committed message, so there will not be a need to resend this previous committed message (and hence it can be removed from the commit queue). This ensures that, for a group, the proposal and commit queues are not both populated at the same time for any GCD (this condition already holds true for the coordinator).

3. Task 3: When the message loops back to the coordinator, the coordinator assumes that the message has been acknowledged by all other GCDs.

4. Task 4: When the ack for the message proposal is received by the coordinator (Task 3), the coordinator sends the commit message. It then marks the proposal message as committed. The message is sent around the ring, from one node to the next younger. On each GCD, before sending the message to the next GCD, the message is cached and then forwarded to the next node in the ring. Once the forwarding is complete the cached message is delivered to members of the process group (the clients). All the nodes keep track of the commit messages, in their commit buffers. This is required because a node could, at some point, become the coordinator due to node failures. There can be only one commit message per process group. There is a commit time-out for each message. If the time-out value is reached, the coordinator resends the commit message. Nodes who have already seen the commit message pass the message to the next node as often as necessary. The method considers these failures:

a. Coordinator failure: if the new coordinator has received the commit message, the new coordinator resends the commit message. If the commit message did not reach the new coordinator, the message is in the proposal buffer of the new coordinator node. The message is copied to the new coordinator's pending queue and the proposal message is resent.

b. Other GCS instances fail: if the GCS instance has not received the commit message or has received the message and not delivered to its clients, it does not matter A message to indicate the change in the process group membership, due to the failing node is queued by the coordinator in its pending messages queue. This newest membership will be delivered sometime later. if the failing GCD had delivered the message to the clients and failed before passing the message to next GCD in the ring, the comnit message will resent by the coordinator after the commit time-out.

c. A GCS instance joins: The node will ignore all the commit messages until there is a client for the GCS instance. Until that time, it merely acts as a conduit, passing along all messages.

d. All nodes who have received commit message fail: Since all nodes keep track of the proposal messages, the new coordinator resends the messages from its proposal queue.

5. Task 5: When the commit message loops back to the coordinator, the coordinator assumes that the message has been acknowledged. It is assumed that all the process group members have received the message from the GCS instances. The coordinator removes the message from the commit queue and continues to process the next message from its pending queue. The pending queue is not a serializing queue: rather, the coordinator preserves FIFO for all messages in a group that originate from the same node by determining the next message as follows. The coordinator maintains a 2-dimensional array of the sequence numbers of the last message committed for each group on each node, and a 1-dimensional array of incarnation numbers of each node. An element of the sequence number array is updated when the corresponding message loops back to the coordinator in the commit phase (i.e., beginning of Task 5). An element of the incarnation number array is updated when the node receives a message from another with the new incarnation number for the first time. The sequence number of a message determines its ordering, and is assigned by the source GCS instance. These sequence numbers start at 1 for each group on each node, and increase consecutively. To pick the next message to propose, the coordinator goes down the pending queue of that group, searching for the earliest message (both in terms of the incarnation and sequence numbers) from the node whose message is at the head of the queue. If the sequence number of the earliest message in the pending queue for this group-node pair is not the next one in sequence when compared to the sequence number of the last committed message, then this message is not ready to be sent out. The next node in this group is then considered and so on until either a valid message is found, or there are no messages in this group that can be proposed yet.

6. Task 6: The clients of a GCD exchange heartbeats with it. If the process group membership has changed, the GCD acknowledges the heartbeat with the process group membership information.

Some other assumptions made by this protocol are described here.

The protocol assumes that if the message reaches a particular GCD 34, it will be sent to the clients of that server 12.

At any point, only one message per process group can be going through the protocol tasks 2, 3, 4, and 5.

A GCS instance 34 has a commit buffer for each process group and a proposal buffer for each process group. These buffers hold at most one proposal or commit message.

All GCS instances 34 have to maintain a commit buffer and a proposal buffer for all process groups in the cluster (even if the GCS instance 34 does not have any clients in the process group). It is necessary because any node could become the coordinator and therefore must be able to continue the protocol where it stopped.

The coordinator has a separate serializing pending queue for each group, to keep all the messages initiated by other GCS instances.

Should a node go down, on every other node CMS will notify GCS 34 of the event. The GCS instance 34 acting as coordinator will determine which clients of which groups have vanished and the coordinator will generate new membership messages for the vanished clients.

The protocol has the following time-outs:

1. A coordinator time-out for proposal messages which are sent but not acked.
2. A coordinator time-out for commit messages which are sent but not acked.
3. An initiator time-out for messages sent to the coordinator but which never show up in a proposal message from the coordinator.
4. A general GCD time-out for clients not supplying heartbeats within a specific period.
5. Two general GCD time-out for heartbeats with CMS.

In some embodiments, in response to a membership change, the GCS instances or Group Communication Daemons (GCDs) 34 send only the incremental information around (as opposed to the total membership message). In addition to this avoiding memory hogging problems in the GCD, it also always maintains correctness of membership information: i.e., a change in membership message is never outdated by the current membership information that a GCD has (this scenario can result if total membership messages are sent around). However, each GCD must always have the total membership information since ft may become the coordinator at any time; this is accomplished by it getting the total membership information from the coordinator when ft initializes, and then updating it with incremental membership changes throughout. The coordinator starts with an initial total membership of "empty".

The initialization protocol that a GCD has to follow in order to obtain the initial total membership information is as follows:

1. On startup, a new GCD sends a "new GCD" message to the coordinator.
2. For each group, it sets a flag new group[gindex] to true.
3. When it gets a "new GCD reply" for a group from the coordinator, or a membership message for a group with group sequence number of 1, it sets the corresponding newgroup[gindex] flag to false. The first case is straightforward, and the second case deals with groups that got formed after the coordinator responded to a "new GCD" request message. If a client registers locally (membership message with a sequence number of 1), it does not set the newgroup flag to false, but does build a group structure. Not setting the flag prevents it from reading any group related information for an existing group, until it gets the "new GCD reply" for this group. It may happen that a new GCD may get a "new GCD reply" after having seen a message with a group message sequence number of 1 for this group (for example, if this message was going around at the same time when this GCD sent its "new GCD" request).

If a client wants to register with this GCD, the GCD will only accept the registration request if:
  the newgroup[gindex] flag is false for this group, or
  the "new GCD" message has reached the coordinator—the local GCD can be sure of this only when this message comes back to it in the PROPOSE state. This is necessary in case the "new GCD" message gets lost in transit. Then the client registration request will proceed without the local GCD having the total membership information about that group.

A new GCD does need to accept registration messages under the above conditions and not wait to get a "new GCD reply" from the coordinator, since that may not happen for a group of which the client in question is the first member.

4. When it gets a "new GCD" message back from the coordinator, it updates its initiating queue when in proposal phase. When it gets this message in the commit phase, it just drops it.

5. If it gets any other type of message for a group, it will only process it if its newgroup flag for that group is false. It will forward all messages to its next GCD, as always. NOTE: There is no message in the initiating queue corresponding to the "new GCD reply" messages.

When the coordinator gets a GCSMSG_NEWGCD message from another GCD, it performs the following:

1. It queues the group membership of all the existing groups in their corresponding group pending/proposal queues. The message type for these messages is set to "new GCD reply"

2. It also sends the original "new GCD" message back to the sender GCD. It is necessary to have the original "new GCD" message sent around in order to tell the new GCD that the coordinator has received the "new GCD" request. This is necessary for cases when there will be no "new GCD reply" messages—i.e. when no groups exist (at startup).

The coordinator GCD itself does not go through the New GCD Initialization Steps; it sets the flag newgroup[gindex] for all groups to false when it starts up.

Both the "new GCD" and "new GCD reply" messages go through the two-phase commit process described earlier with the new GCD as the destination id (a GCD instance id is defined to be 0); other GCDs just act as forwarders of such messages. Until the new GCD receives and processes a "new GCD reply" message sent to it by the coordinator for a group, ft itself serves as a message forwarder for that group as far as the other messages going around in the system are concerned.

In some embodiments, GCS 34 needs to obtain information about node membership of the cluster from the CMS 32 layer. To achieve this, a GCD 34 process needs to register with CMS 32 at startup and then periodically ask CMS for node membership changes. After registering with CMS, GCD 34 sets up several ways of receiving information from CMS periodically.

It asks CMS to give it asynchronous notification of a change in the node membership. In some embodiments, a signal delivery mechanism is used, specifically, it asks CMS to send it a SIGUSR2 for this purpose.

It registers as a critical client of CMS, asking CMS to check for its liveliness at a particular configurable interval. In some embodiments, this results in CMS sending GCD a SIGUSR2 signal periodically.

It sets up a periodic pulsing timer to do voluntary CMS pulsing at least once every cms_pulse_time, a configurable parameter.

Whenever a GCD is checked for liveliness, (e.g. it receives a SIGUSR2) it polls the CMS daemon 32 for new node membership information. If it does not get this signal from cmsd for cms_pulse_time, GCD polls CMS anyway. This is necessary for cases when the CMS daemon has been killed and could not send GCD any notification.

In some embodiments, the node membership information from CMS includes the number of nodes in the cluster at a given time, and for each of the nodes, the id, states, the active IP address, status, mode, incarnation, and age.

If a node that is part of the current cluster changes state from "Up" to "Down" or to "Unknown" then that is equivalent to all GCS clients on that node being excluded from the group membership. The coordinator GCD originates these messages for each node that goes down or to an unknown state. No special processing is needed for a node whose state has just changed to "Up"

CMS 32 can deliver 3 types of membership notifications to GCD 34. They are:
  Node Joining
  Node going away
  Node unknown The first two membership modifications are relatively self-explanatory. The third occurs when CMS 34 detects a node going away and when CMS 34 is unable to force a reset of the node. It assumes nothing about the state of the node and returns a node unknown state to GCD.

GCD handles the unknown state in the following way. For the purposes of the GCD ring, the unknown state is treated as though the node entered the down state. That is, GCD attempts to rebuild the ring excluding the node in the unknown state. For the clients, GCD does not interpret the state and returns to the clients new memberships of the type unknown. In this way, clients may interpret such a change in any way they see fit.

If the GCD has a message for a particular client in its initiating queue, it will not accept further messages from that client until this message has been moved to the proposal state. This is done so that a client sending large number of messages does not utilize too much memory causing GCD to fail due to lack of memory. Clients can continue sending messages until it runs out of IPC buffer space.

Thus, in one embodiment, the process group membership service relies on the node cluster membership service to detect node starts and failures. When a node fails, all the processes running on that node are removed from the group membership.

As noted above, nodes must carefully coordinate access to shared resources, such as volumes and IP addresses. In one embodiment, a resource management service is a set of tools that allows processes to atomically allocate groups of shared resources. The service also guarantees that resources requiring exclusive access are allocated only once and takes care of executing all the steps necessary to allocate a resource. For instance, if an IP address moves from one network interface card to another, the service configures down the old interface and configures up the new interface.

Recovery coordination will be discussed next. After a failure is detected, surviving servers must often coordinate recovery. The steps taken to coordinate recovery are specific to an application. Typical steps are: election of recovery coordinator, barrier-type synchronization points and agreement. In one embodiment, a recovery coordination service provides a set of primitives that server processes call to perform a recovery step. For instance, OPS requires system vendors to implement a primitive xmusync(syncid) to implement barrier-type synchronization points.

Highly Available Services for Single-Server Applications

Single-server applications can only be replicated using the primary-restart technique. Even in this environment, single-server applications alone are not able to detect failures and initiate recovery. Recovery along with other tasks are generally performed by the CMS and GMS software layers described above. Such a layer is often termed "restart services". From a certain point of view, restart services can be seen as a multi-server application, though there are no clients.

In one embodiment, such services are composed of a set of distributed servers, and they subscribe to the multi-server HA services described above. These servers are called restart servers.

Restart servers perform the following tasks:
1. interact with the CMS and GMS membership services;
2. interact with resource management services;
3. monitor the server component of the given application; and
4. stop and start of the server component of the given application.

This can be understood by reviewing the following example. A web W server is running on node $N_1$ in a primary-restart configuration. Node $N_2$ is the backup. When node $N_1$ crashes, the restart server on node $N_2$ is notified of a membership change through CMS and/or GMS, and initiates recovery. The goal is to restart W on node N 2. The restart server on node $N_2$ calls the resource manager service to allocate the resources needed to restart W on $N_2$. The resource manager mounts the filesystems needed by W on node $N_2$ and moves the IP address used by the web server to a network interface on node $N_2$. After receiving confirmation from the resource management service, the restart service starts W on node $N_2$.

Figure 2:
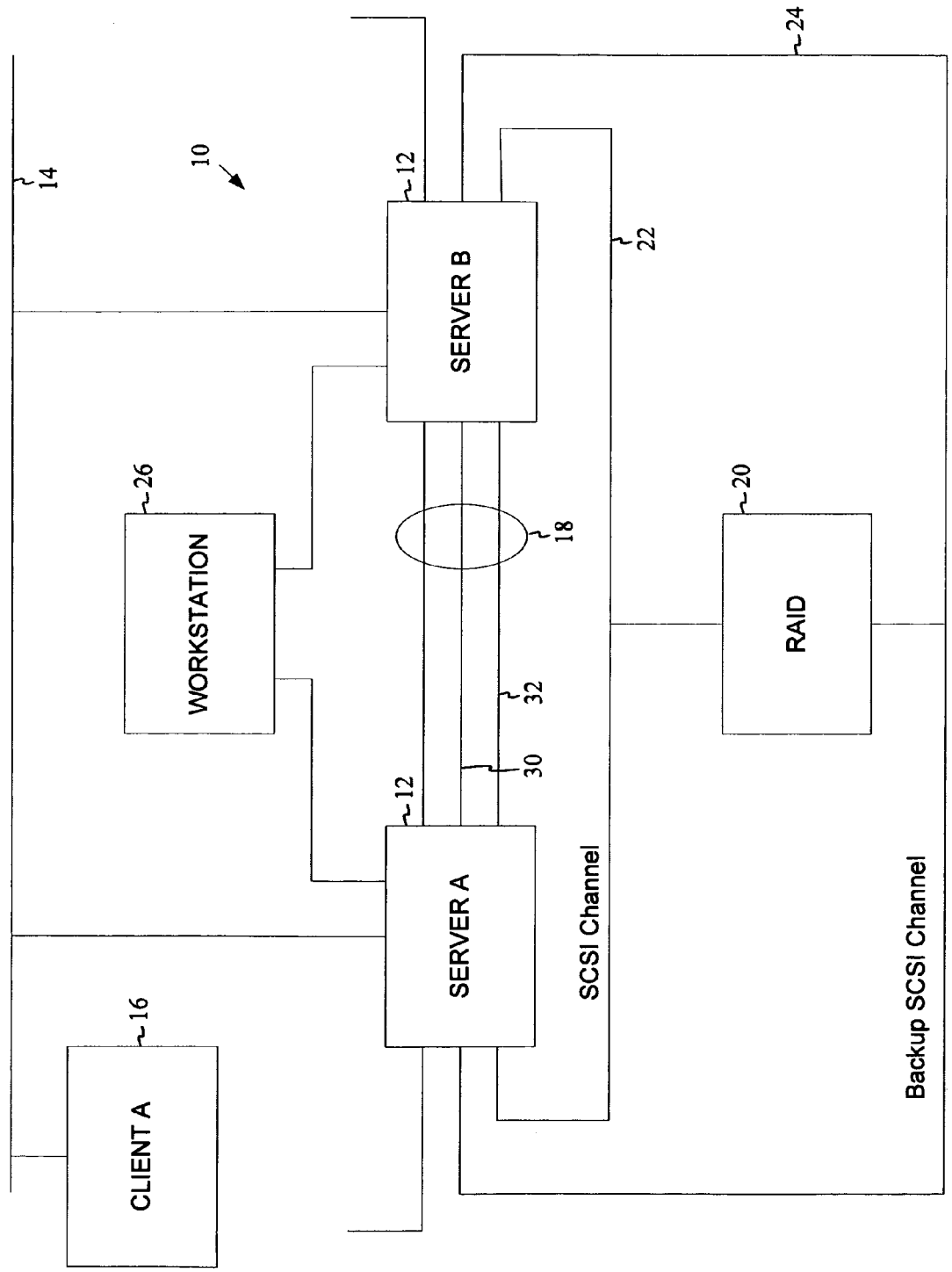
FIG. 2 is a block diagram of a network configuration for a high-availability system in which embodiments of the invention may be practiced.

In one embodiment, clustered servers 12 share storage either on RAID or mirrored disks. One such embodiment is shown in FIG. 2, where a RAID system 20 is connected to each of the cluster servers 12 over a SCSI channel 22. In addition, a backup SCSI channel 24 is provided for fail over of channel 22. A shared storage subsystem allows either server 12 to assume control of the data in the event of a failure. The software is designed so that one machine will automatically take over the other system's filesystems in the event of a failure.

In one embodiment, a workstation 26 is connected to the servers 12 in order to control the HA software running on each of the servers 12. Such an embodiment is shown in FIG. 2. In another embodiment, the HA software running on each of the servers 12 is configured using a GUI running on one or more of the clients 16.

In one embodiment, system 10 can be configured either as active/standby or dual active. In an active/standby configuration, one server 12 runs the workload while the other server 12 is in standby mode, prepared to take over if the primary server fails. In the dual active configuration, both servers 12 are doing useful work while acting as each other's backup. In the event of a failure, the logical backup server is doubly loaded, running not only its own workload, but also that of the failed server.

In some embodiments, part of the HA software is the application monitor. In one embodiment, the application monitor is a daemon process that monitors heartbeat messages and executes application-specific scripts for monitoring applications. An instance of this daemon runs on each server 12 of the cluster. In the event of a server or application failure, the daemon on the surviving server 12 executes software to cause the surviving server to assume the public network address of the failed server 12 and answer requests from clients 16 on network 14. In one embodiment, as noted above, clients 16 perceive the failover process as a rapid reboot of the failed primary server.

Figure 3:
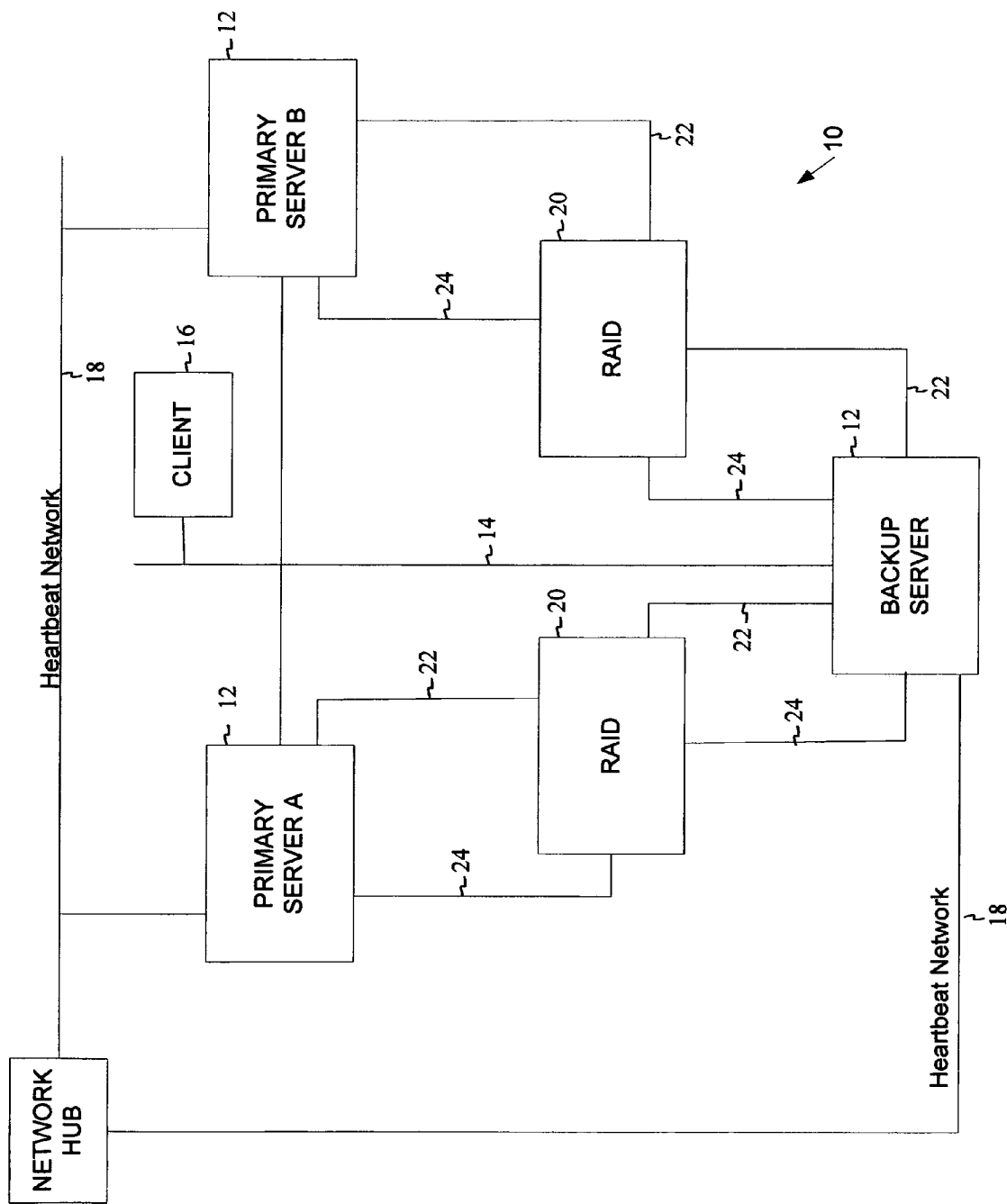
FIG. 3 is a block diagram of an alternative network configuration for a high-availability system in which embodiments of the invention may be practiced.

Yet another embodiment of system 10 is shown in FIG. 3. In FIG. 3, up-to eight servers are connected to both a public network 14 and a private network 18. Clients 16 use public network 14 to access services from clustered system 10. The HA software uses private network 18 to exchange heartbeat and other control messages. In the event of a server or application failure, one of the surviving server 12 assumes the public network address of the failed system and responds to the client requests on network 14. Clients 16 perceive the failover process as a rapid reboot of the system to which they were connected.

In one embodiment, the HA software is built on top of a Cluster Administration and Membership Services (CAMS) layer. The CAMS layer is highly sophisticated distributed software that efficiently controls the applications in a cluster. This layer enables efficient addition and deletion of systems and applications from a cluster and also intelligently recovers the cluster from network partitioning.

In one embodiment, the clustered servers 12 share storage either on RAID 20 or mirrored disks. A shared storage subsystem allows multiple servers 12 to assume control of the data in the event of a failure when the filesystems are automatically made available on the system(s) where their corresponding applications are resumed.

In one embodiment, a system 10 cluster can be configured either in N×1 or in N×N mode. In an N×1 configuration (such as is shown in FIG. 3), N servers 12 run various mission critical applications while one machine is in standby mode, prepared to take over if any of the primary N servers fail. This configuration ensures that your environment sees no performance degradation even after the failure of a server 12.

In N×N configuration, however, all servers 12 are running business applications while also acting as backup servers. In the event of a failure of a server 12, its workload is failed over to one or more of the surviving servers 12 in the cluster. The workload of the failed server can then be divided among multiple servers, preventing overloading of any server.

In one embodiment, system 10 provides a set of services that can be used to port multi-server applications across existing servers 12. In one such embodiment, a common set of base services that are application independent are isolated. Application dependent services are then implemented on top of the common infrastructure.

In one embodiment, system 10 includes an HA infrastructure and a set of HA applications. In such an embodiment, the HA infrastructure provides the foundation on which HA applications can be built. The HA infrastructure includes node and group membership, fault-tolerant group communication, and system resources management.

In the above discussion, the term "computer" is defined to include any digital or analog data processing unit. Examples include any personal computer, workstation, set top box, mainframe, server, supercomputer, laptop, wireless communication device or personal digital assistant capable of embodying the inventions described herein.

Examples of articles comprising computer readable media are RAM (Random Access Memory), ROM (Read-Only Memory), floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A computing system comprising:
   a plurality of nodes connected by a network;
   a cluster membership service operating on the plurality of nodes, the cluster membership service operable to determine membership in a cluster by exchanging messages, wherein a message originating from a node includes a node data area defining the node's view of the cluster relationships and wherein the message includes a checkmark data structure in which each node receiving the message sets the checkmark data structure according to whether the receiving node confirms the relationship defined in the node data area;
   a group membership service operable to determine membership in a group of nodes formed by a subset of nodes in the cluster of a process executing on a node in the plurality of nodes the group of nodes for an application distributed across two or more of the nodes in the group, said membership communicated between the two or more nodes in the group utilizing a proposal message sent by a coordinator node for receipt by each node in the group and a commit message sent by the coordinator node to each node in the group after receiving acknowledgement that the proposal message has reached each node of the group, and further wherein the plurality of nodes in the group communicate with each other to detect a failure of an application in the group on a first node of the cluster and to transfer applications from the first node to other nodes of the plurality of nodes in the group on detecting the failure.

2. A method of maintaining high availability in a server cluster having a plurality of nodes, the method comprising:
   determining membership by a cluster membership service in a cluster by exchanging messages, wherein a message originating from a node includes a node data area defining the node's view of the cluster relationships and wherein the message includes a checkmark data structure in which each node receiving the message sets the checkmark data structure according to whether the receiving node confirms the relationship defined in the node data area;
   instantiating a group communications service, a group membership service and a system resource manager on each node of the plurality of nodes, the plurality of nodes forming a group;
   communicating process membership in the group utilizing a proposal message sent by a coordinator node for receipt by each node in the plurality of nodes and a commit message sent by the coordinator node to each node in the plurality of nodes after receiving acknowledgement that the proposal message has reached each node of the plurality of nodes;
   communicating between the group communications service, the group membership service and the system resource manager on each node of the group to detect process failures and node failures within the group;
   upon detecting a failure in a process on a first node of the group, transferring applications to other nodes of the group; and
   updating, by the group membership service, process membership in a distributed application upon detecting a process failure on a node of the group.

3. A computer-readable medium having instructions stored thereon, wherein the instructions, when executed in a computer, perform operations comprising:
   determining membership by a cluster membership service in a cluster by exchanging messages, wherein a message originating from a node includes a node data area defining the node's view of the cluster relationships and wherein the message includes a checkmark data structure in which each node receiving the message sets the checkmark data structure according to whether the receiving node confirms the relationship defined in the node data area;
   instantiating a group communications service, a group membership service and a system resource manager on each node of a plurality of nodes, the plurality of nodes forming a group;
   communicating process membership in the group utilizing a proposal message including data defining one or more relationships between the plurality of nodes sent by a coordinator node for receipt by each node in the plurality of nodes and a commit message sent by the coordinator node to each node in the plurality of nodes after receiving acknowledgement that the proposal message has reached each node of the plurality of nodes;
   communicating between the group communications service, the group membership service and the system resource manager on each node of the group to detect process failures and node failures within the group;
   upon detecting a failure in a process on a first node of the group, transferring applications to other nodes of the group; and
   updating, by the group membership service, process membership in a distributed application upon detecting a process failure on a node of the group.

4. The computing system of claim 1, wherein the plurality of nodes includes an initiator node to send the proposal message to the coordinator node.

5. The computing system of claim 4, wherein the coordinator node comprises an oldest node in the plurality of nodes.

6. The computing system of claim 4, wherein the plurality of nodes are arranged in a network ring, the order of the plurality of nodes in the network ring being defined by a cluster membership age of each node in the plurality of nodes and wherein the coordinator node forwards the proposal message to a first node of the plurality of nodes, and wherein the proposal message is forwarded by a receiving node in the network ring to a successor node of the receiving node.

7. The computing system of claim 6, wherein the coordinator node issues the commit message upon receiving the proposal message from a non-initiator node in the network ring.

8. The method of claim 2, wherein communicating the proposal message includes sending by an initiator node the proposal message to the coordinator node.

9. The method of claim 8, wherein the coordinator node comprises an oldest node in the plurality of nodes.

10. The method of claim 8, further comprising:
arranging the plurality of nodes in a network ring;
forwarding by the coordinator node the proposal message to a first node of the plurality of nodes; and
forwarding by the first node to a next node in the network ring.

11. The method of claim 10, wherein the coordinator node issues the commit message upon receiving the proposal message from a non-initiator node in the ring.

12. The method of claim 10, wherein upon receiving the commit message a node of the plurality of nodes in the network ring performs the tasks of:
caching the commit message;
forwarding the commit message to a next node in the network ring;
upon completing forwarding the commit message delivering the commit message to each process of a process group on the node.

13. The computer readable medium of claim 3, wherein communicating the proposal message includes sending by an initiator node the proposal message to the coordinator node.

14. The computer readable medium of claim 13, wherein the coordinator node comprises an oldest node in the plurality of nodes.

15. The computer readable medium of claim 13, wherein the method further comprises:
arranging the plurality of nodes in a network ring;
forwarding by the coordinator node the proposal message to a first node of the plurality of nodes; and
forwarding by the first node to a next node in the network ring.

16. The computer readable medium of claim 15, wherein the coordinator node issues the commit message upon receiving the proposal message from a non-initiator node in the ring.

17. The computer readable medium of claim 15, wherein upon receiving the commit message a node of the plurality of nodes in the network ring performs the tasks of:
caching the commit message;
forwarding the commit message to a next node in the network ring;
upon forwarding the commit message delivering the commit message to each process of a process group on the node.

* * * * *

UNITED STATES PATENT AND TRADEMARK OFFICE
CERTIFICATE OF CORRECTION

PATENT NO. : 7,627,694 B2  Page 1 of 1
APPLICATION NO. : 09/811158
DATED : December 1, 2009
INVENTOR(S) : Sreenivasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Second Day of November, 2010

David J. Kappos
*Director of the United States Patent and Trademark Office*